United States Patent
Rothstein et al.

(10) Patent No.: US 10,767,754 B2
(45) Date of Patent: Sep. 8, 2020

(54) DRIVELINE COMPONENT WITH DIFFERENTIAL ASSEMBLY AND DIFFERENTIAL LUBRICATION DEVICE

(71) Applicant: AMERICAN AXLE & MANUFACTURING, INC., Detroit, MI (US)

(72) Inventors: Moshe Rothstein, Oak Park, MI (US); Douglas J. Chemelli, Royal Oak, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 146 days.

(21) Appl. No.: 15/992,277

(22) Filed: May 30, 2018

(65) Prior Publication Data
US 2019/0368597 A1 Dec. 5, 2019

(51) Int. Cl.
*F16H 57/04* (2010.01)
*F16H 48/08* (2006.01)

(52) U.S. Cl.
CPC ......... *F16H 57/0483* (2013.01); *F16H 48/08* (2013.01); *F16H 57/043* (2013.01); *F16H 57/0436* (2013.01)

(58) Field of Classification Search
CPC ............... F16H 57/0483; F16H 57/042; F16H 57/0427; F16H 57/043
See application file for complete search history.

(56) References Cited

U.S. PATENT DOCUMENTS

| | | | |
|---|---|---|---|
| 1,874,646 A * | 8/1932 | Skinner | F16H 57/0427 184/13.1 |
| 3,145,583 A | 8/1964 | Frentzel | |
| 5,709,135 A * | 1/1998 | Baxter | B60K 17/20 475/160 |
| 5,989,143 A * | 11/1999 | Bell | F16H 57/0421 184/11.2 |
| 7,963,875 B2 | 6/2011 | Hilker et al. | |
| 7,976,421 B2 | 7/2011 | Nakajima et al. | |
| 10,267,407 B2 * | 4/2019 | Hill | F16H 57/0483 |
| 2016/0290486 A1 * | 10/2016 | Nishimura | F16H 57/0483 |

FOREIGN PATENT DOCUMENTS

| | | | |
|---|---|---|---|
| CN | 206816781 U | 12/2017 | |
| DE | 1178659 B | 9/1964 | |
| EP | 0280093 A1 | 8/1988 | |
| JP | 08170717 A * | 7/1996 | F16H 57/0483 |

* cited by examiner

*Primary Examiner* — Sherry L Estremsky
(74) *Attorney, Agent, or Firm* — Burris Law, PLLC

(57) ABSTRACT

A vehicle driveline component with a differential mechanism and a lubrication device for lubricating the differential mechanism. The differential mechanism has a differential input member, which is rotatable about a differential axis, and a pair of differential outputs that are driven by the differential input member. The lubrication device includes at least one discharge port that is disposed in a volume within the differential input member and along the differential axis between the differential outputs.

17 Claims, 7 Drawing Sheets

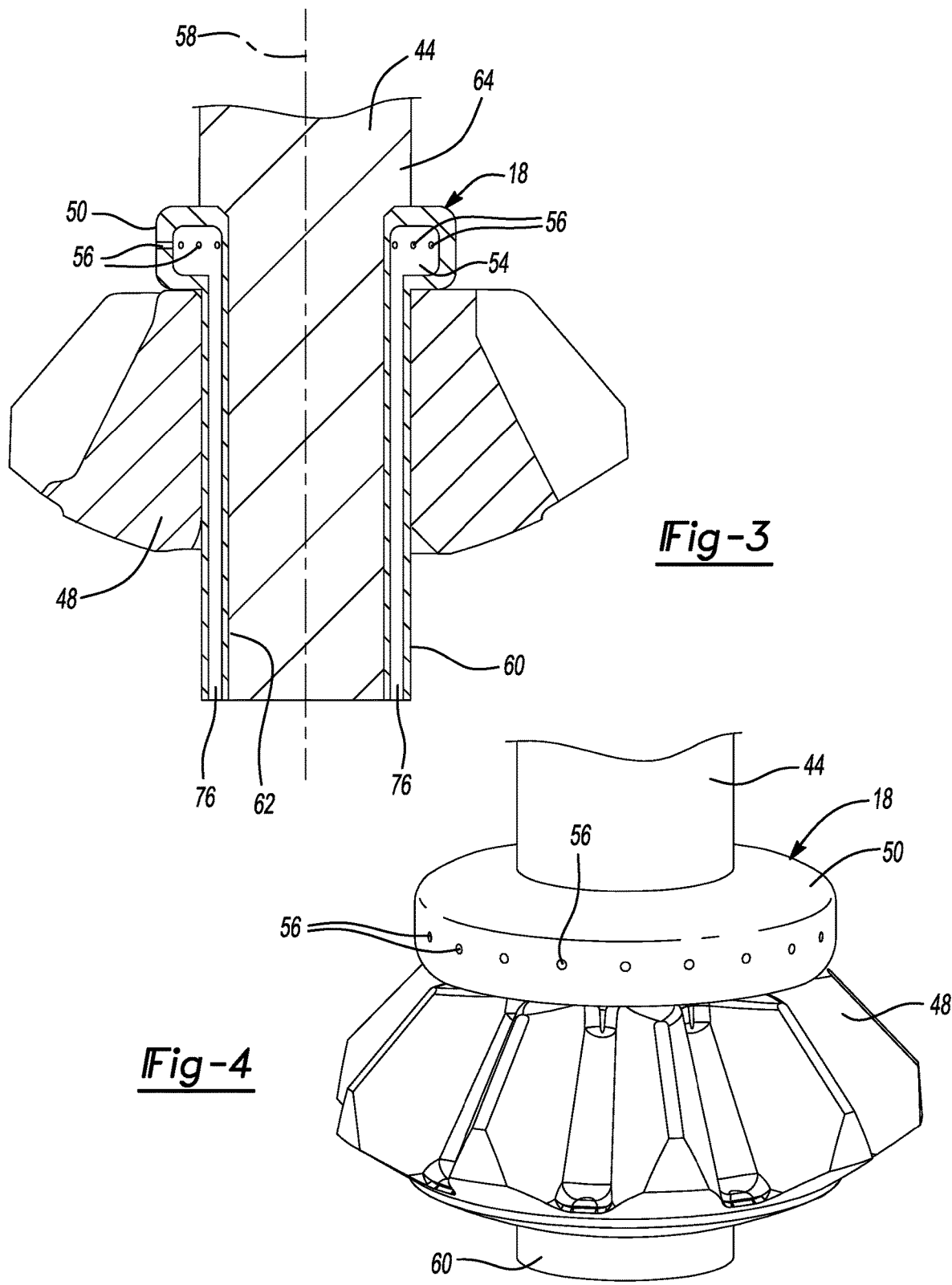

US 10,767,754 B2

DRIVELINE COMPONENT WITH DIFFERENTIAL ASSEMBLY AND DIFFERENTIAL LUBRICATION DEVICE

FIELD

The present disclosure relates to a driveline component having a differential assembly and a differential lubrication device for lubricating the differential assembly.

BACKGROUND

This section provides background information related to the present disclosure which is not necessarily prior art.

It is common for modern vehicle drivelines to incorporate one or more differential assemblies for controlling the distribution of power to two driven components. Frequently, the driven components are vehicle wheels, but the driven components could be a pair of shafts that transmit rotary power to two drive axles. The differential assembly generally has a differential input member and a mechanism of some type that transmits rotary power from the differential input to the differential outputs while permitting speed differentiation between the differential outputs. Splash lubrication is commonly employed to lubricate the differential assembly. More specifically, the differential input member rotates through a liquid lubricant in a sump during operation of the vehicle. While the known splash lubrication techniques can be effective, it would be desirable to provide lubricant to the differential assembly at a location within the differential assembly to better lubricate the mechanism that transmits rotary power from the differential input member to the differential outputs.

SUMMARY

This section provides a general summary of the disclosure, and is not a comprehensive disclosure of its full scope or all of its features.

In one form, the present teachings provide a vehicle driveline component that includes a differential input member, a pin, a pair of side gears, a differential pinion and a lubricant reservoir. The differential input member defines a cavity and is rotatable about a differential axis. The pin extends into the cavity. The side gears are received in the cavity and are rotatable about the differential axis. The differential pinion is received in the cavity and is meshingly engaged to the side gears. The lubricant reservoir is received in the cavity and mounted to the pin. The lubricant reservoir defines an internal reservoir and a plurality of reservoir outlet ports that fluidly couple the internal reservoir to the cavity.

The differential case is rotatable about a differential axis and defines a case cavity. The cross-pin is fixedly coupled to the differential case and extends into the case cavity. The side gears are received in the case cavity and are rotatable about the differential axis. The differential pinions are received in the case cavity and disposed about the cross-pin. The differential pinions are meshingly engaged to the side gears. The lubricant reservoir is mounted to the cross-pin and disposed along the cross-pin between the differential pinions. The lubricant reservoir defines an internal reservoir and a plurality of reservoir outlet ports that fluidly couple the internal reservoir to the case cavity.

In another form, the teachings of the present disclosure provide a vehicle driveline component having a differential mechanism and a lubrication device for lubricating the differential mechanism. The differential mechanism has a differential input member, which is rotatable about a differential axis, and a pair of differential outputs that are driven by the differential input member. The lubrication device includes at least one discharge port that is disposed in a volume within the differential input member and along the differential axis between the differential outputs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an enlarged portion of FIG. 2 illustrating the mounting of a lubricant reservoir on a cross-pin and the mounting of a differential pinion on the lubricant reservoir;

FIG. 4 is a perspective view of the differential pinion, the lubricant reservoir and a portion of the cross-pin;

Figure 8:
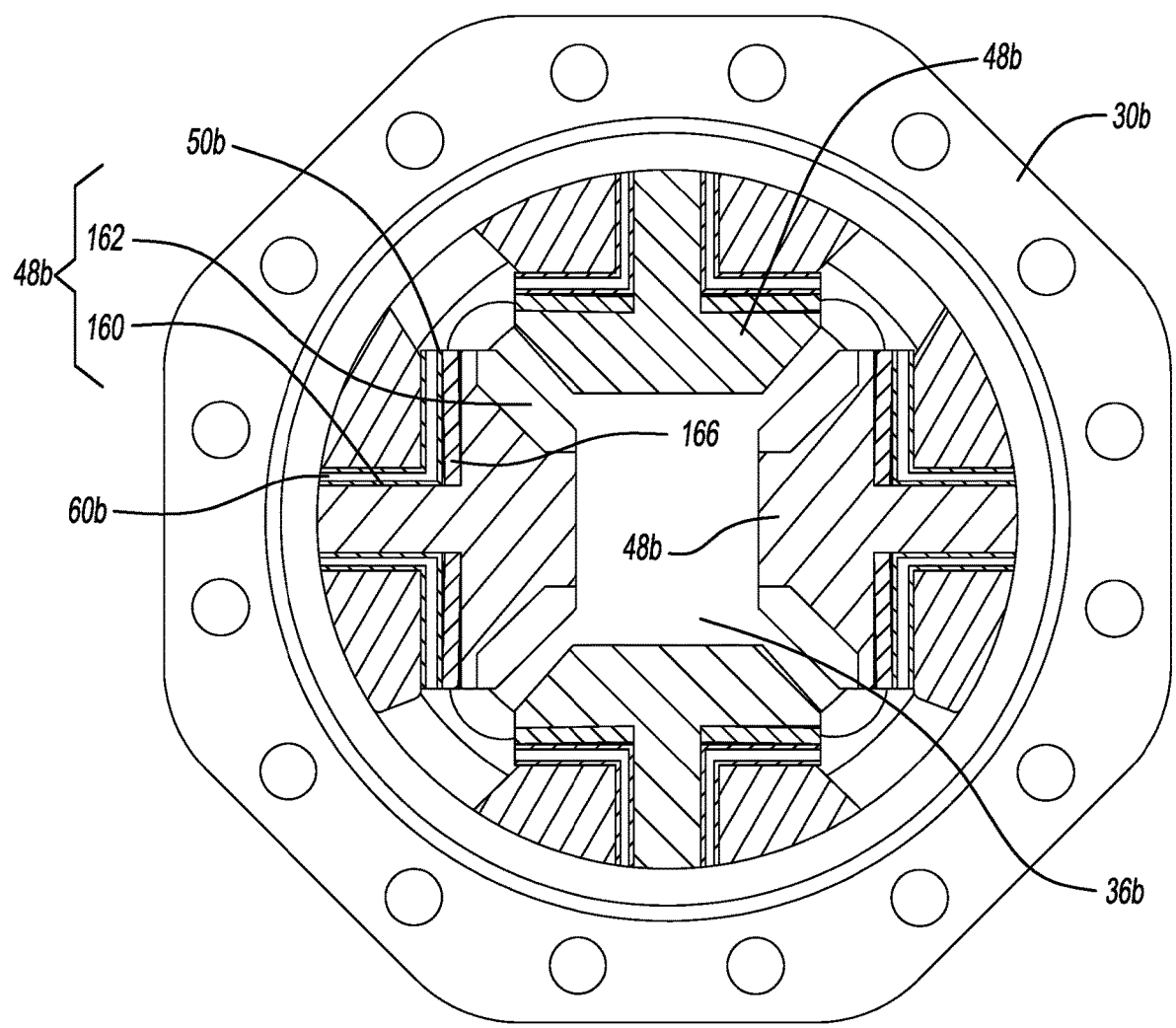
Figure 9:
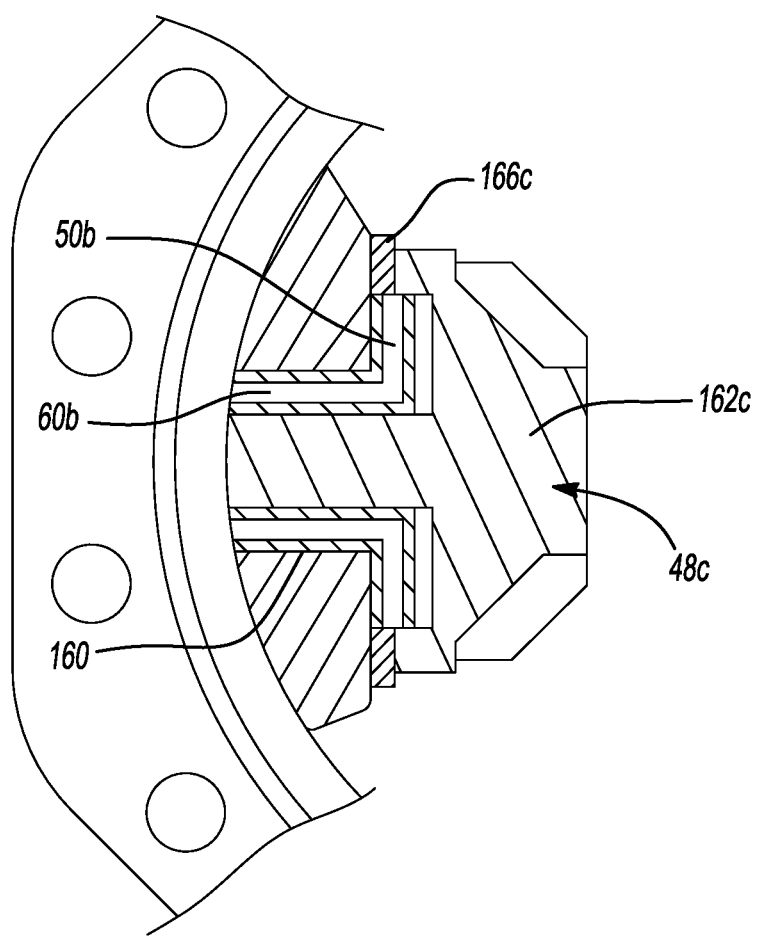

FIG. 8 is a cross-sectional view of a portion of another vehicle driveline having a differential assembly that utilizes hubbed differential pinions and a lubricant reservoir constructed in accordance with the teachings of the present disclosure; and FIG. 9 is a cross-sectional view of a portion of another vehicle driveline having a differential assembly that utilizes hubbed differential pinions and a lubricant reservoir constructed in accordance with the teachings of the present disclosure.

Corresponding reference numerals indicate corresponding parts throughout the several views of the drawings.

DETAILED DESCRIPTION

Figure 1:
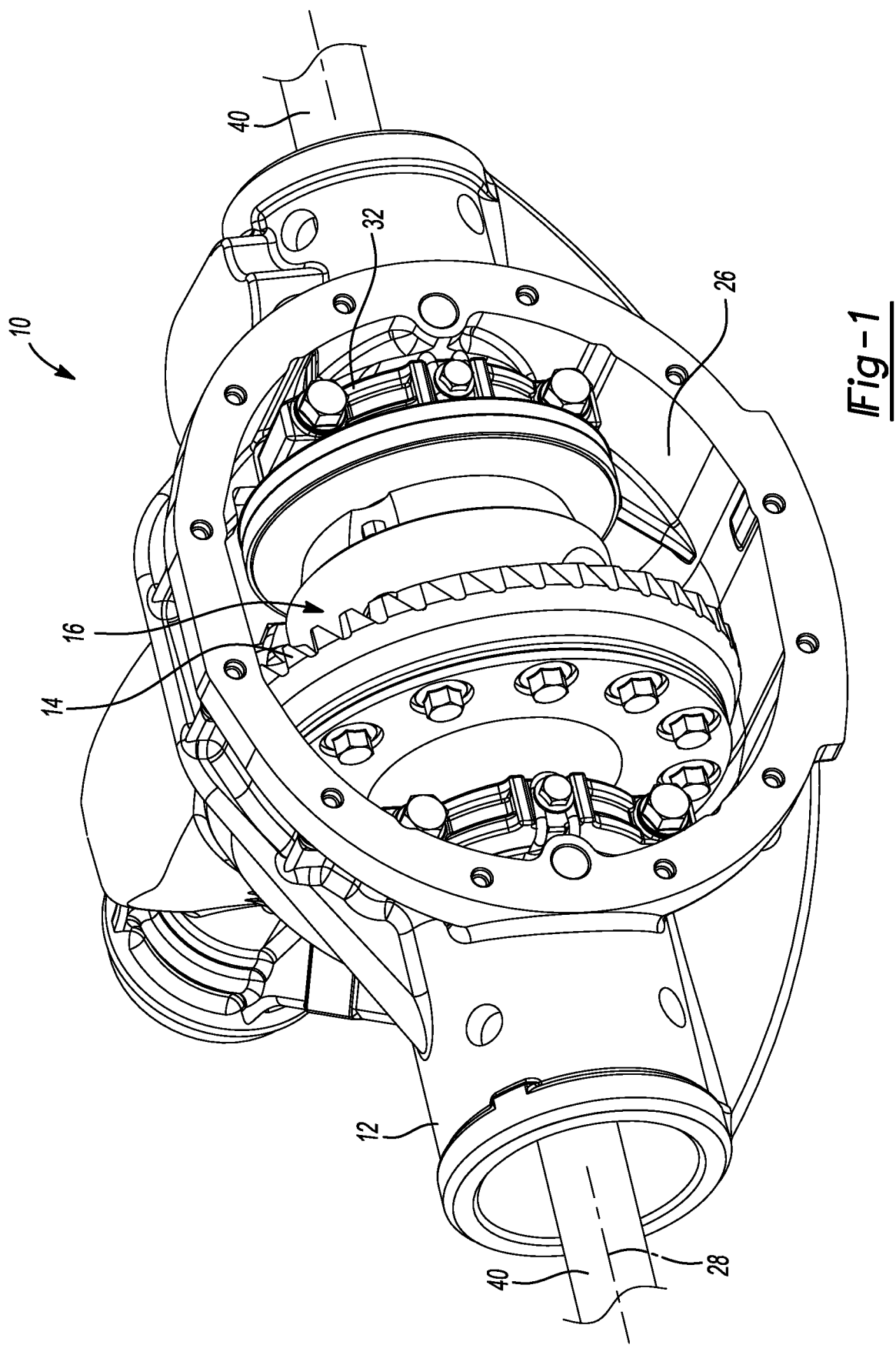
FIG. 1 is a perspective view of a portion of a vehicle driveline component constructed in accordance with the teachings of the present disclosure.
Figure 2:
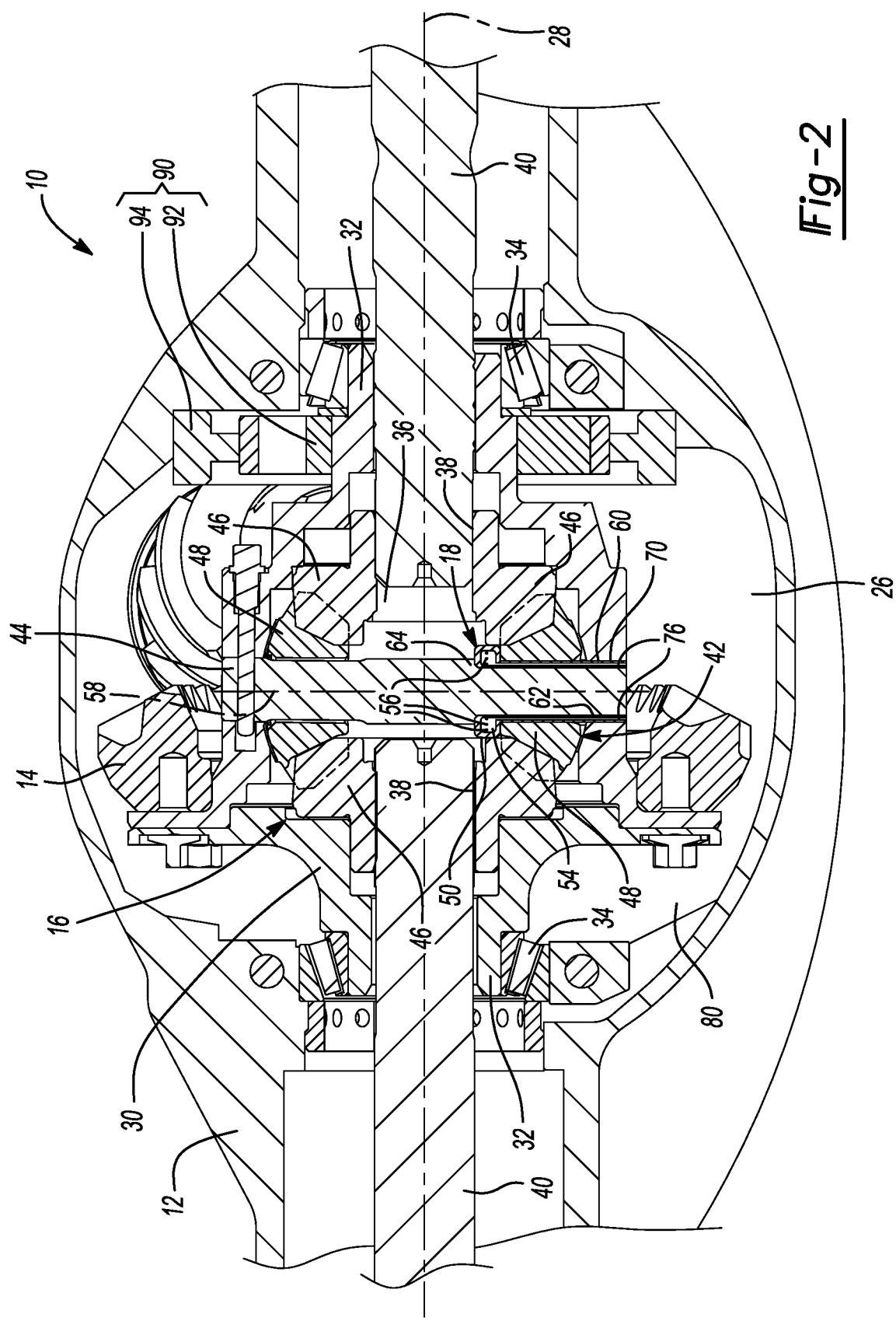
FIG. 2 is a cross-sectional view of the vehicle driveline component of FIG. 1.

With reference to FIGS. 1 and 2, an exemplary vehicle driveline component is generally indicated by reference numeral 10. In the particular example provided, the vehicle driveline component is a rear axle assembly, but it will be appreciated that the teachings of the present application are applicable to other types of vehicle driveline components, including without limitation center differentials and front axles and transaxles.

The vehicle driveline component 10 can include a housing 12, a ring gear 14, a differential assembly 16, and a differential lubrication device 18. The housing 12 can define a central cavity 26 and a differential axis 28. The ring gear 14 can be received in the central cavity 26 and can rotate relative to the housing 12 about the differential axis 28. It will be appreciated that a pinion (not shown) can be supported for rotation about an axis (not shown) that is transverse to the differential axis 28 and can be meshingly engaged to the ring gear 14 to permit the transmission of rotary power there between.

With specific reference to FIG. 2, the differential assembly 16 can include a differential input member 30, a pair of differential outputs 32 and a means for permitting speed differentiation between the differential outputs 32. The differential input member 30 is received in the central cavity 26, is rotatably coupled to the ring gear 14, and is supported by the housing 12 for rotation about the differential axis 28, for example via a pair of tapered roller bearings 34. The differential input member 30 can be a discrete, unitarily formed component, or an assembly of two or more components, or could be wholly or partly formed with another component, such as the ring gear 14. In the example provided, the differential input member 30 is a differential case that defines a case cavity 36 into which the speed differentiation means is received. Each of the differential outputs 32 can comprise a female splined structure that can receive a male splined segment 38 of an associated output shaft 40.

The speed differentiation means can comprise any means for permitting speed differentiation between the differential outputs 32, such as one or more friction clutches (not shown). In the example provided, the speed differentiation means comprises a differential gearset 42 having a cross-pin 44, a pair of side gears 46 and a plurality of differential pinions 48. The cross-pin 44 can be coupled to the differential input member 30 and can extend into the case cavity 36, for example in a manner that is perpendicular to the differential axis 28. In the particular example provided, the cross-pin 44 is fixedly coupled to the differential input member 30 so that it cannot rotate relative to the differential input member 30. It will be appreciated, however, that the cross-pin 44 could be coupled to the differential input member 30 so as to be rotatable relative to the differential input member 30. Each of the side gears 46 can be received in the case cavity 36 and can be fixedly coupled to (e.g., unitarily and integrally formed with) an associated one of the differential outputs 32 so as to be rotatable about the differential axis 28 relative to the differential input member 30. The differential pinions 48 can be received in the case cavity 36 and can be meshingly engaged with side gears 46. The differential pinions 48 can be disposed about the cross-pin 44 so as to be rotatable relative to the cross-pin 44 about a longitudinal axis of the cross-pin 44.

With reference to FIGS. 2 through 4, the differential lubrication device 18 can comprise a lubricant reservoir 50 that can be disposed in the case cavity 36 within a volume that is located between the differential pinions 48 and along the differential axis 28 between the differential outputs 32. For example, the lubricant reservoir 50 can be mounted to the cross-pin 44 so as to be disposed on the cross-pin 44 between a pair of the differential pinions 48. The lubricant reservoir 50 can define an internal reservoir 54 and a plurality of reservoir outlet ports 56 that can fluidly couple the internal reservoir 54 to the case cavity 36. The reservoir outlet ports 56 can be disposed about an outer circumferential surface of the lubricant reservoir 50 and can be oriented so as to be perpendicular to a longitudinal axis 58 of the cross-pin 44.

In the particular example provided, a hollow, tubular journal 60 is fixedly coupled to the lubricant reservoir 50. The journal 60 can be received on a necked-down portion 62 of the cross-pin 44 so that it is disposed coaxially about the cross-pin 44 and one of the differential pinions 48 is rotatably mounted on the journal 60. A shoulder 64 on the cross-pin 44 can limit movement of the lubricant reservoir 50 along the longitudinal axis 58. The end of the journal 60 that is opposite the lubricant reservoir 50 can be received into a bore 70 formed in the differential input member 30.

Figure 5:
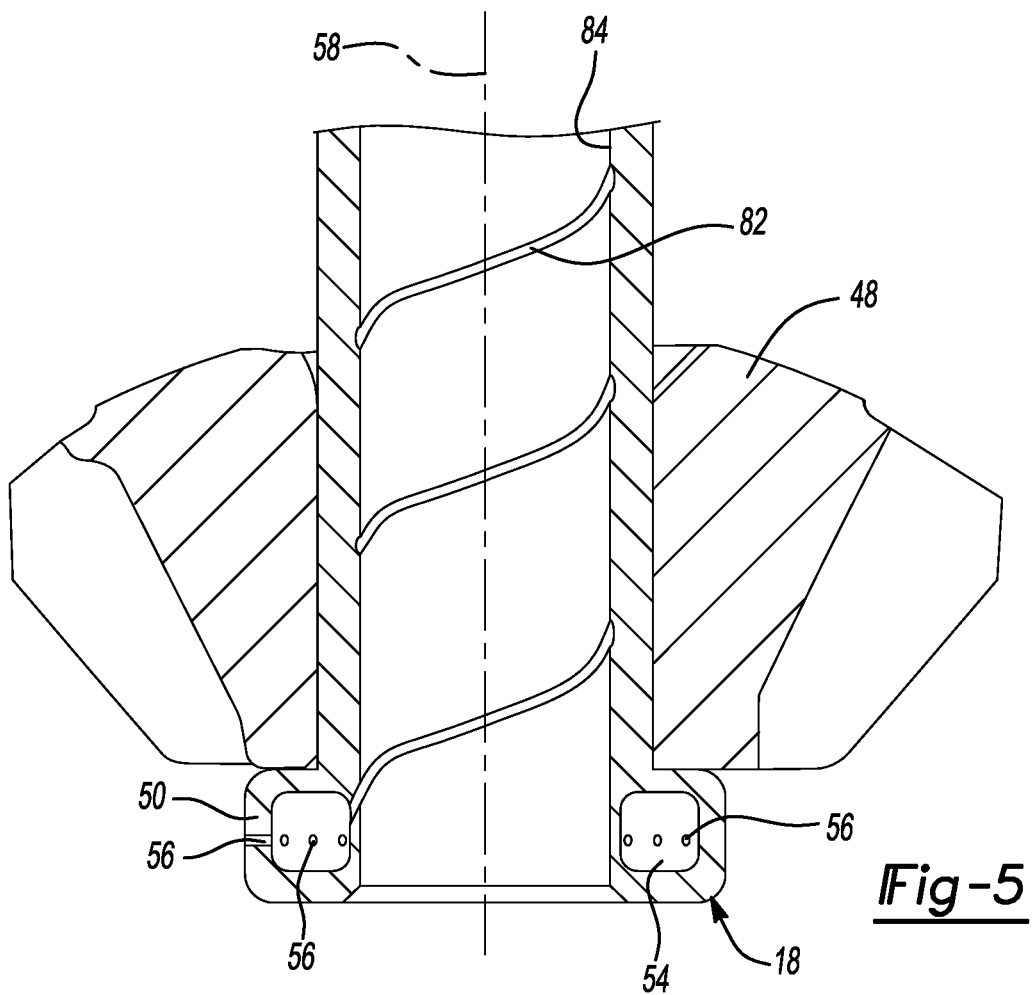
FIG. 5 is a longitudinal cross-sectional view of an alternatively constructed lubricant reservoir.

The journal 60 can define one or more lubricant intake ports 76 that is/are fluidly coupled to the internal reservoir 54. The lubricant intake port(s) 76 can be configured to receive lubricant as the differential assembly 16 rotates about the differential axis 28. More specifically, rotation of the lubricant reservoir 50 through a lubricant held in a sump 80 defined by the central cavity 26 in the housing 12 as the differential assembly 16 rotates about the differential axis 28 can drive lubricant through the lubricant intake ports 76 and into the lubricant reservoir 50. In the example provided, the lubricant intake ports 76 are formed through the journal 60 and are concentrically disposed about the cross-pin 44. It will be appreciated that all or a portion of the lubricant intake ports 76 could be formed by or into the cross-pin 44, for example as a plurality of longitudinally extending grooves (not shown) formed about the perimeter of the cross-pin 44. With reference to FIG. 5, the lubricant intake port 76 could comprise a helical groove 82 formed about the interior circumferential surface 84 of the journal 60.

Figure 6:
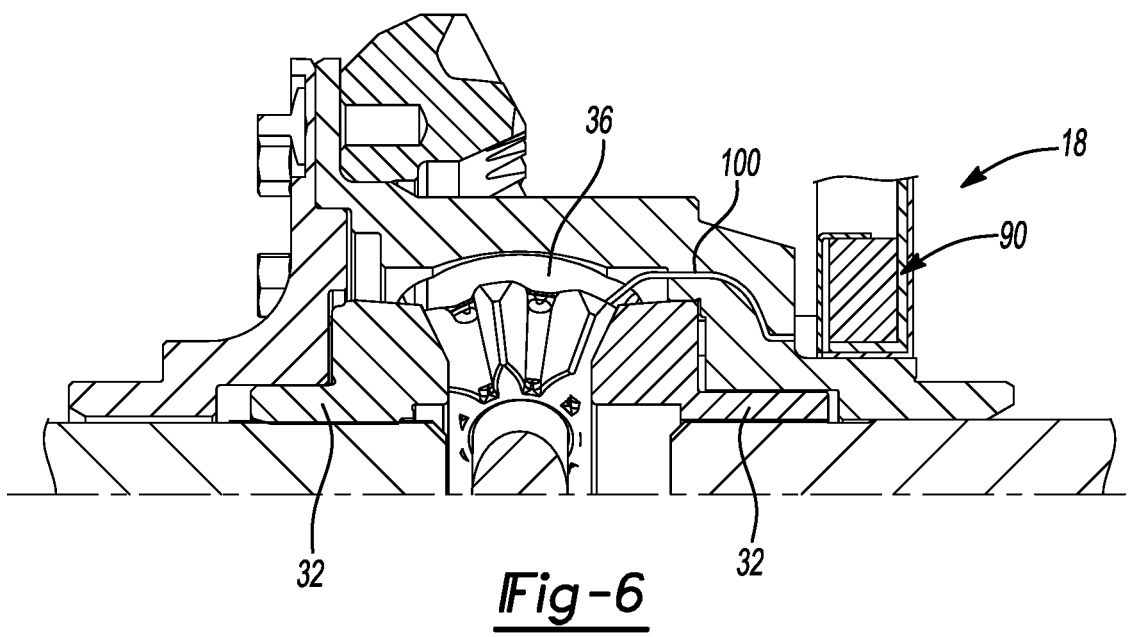
FIG. 6 is a cross-sectional view of a portion of another vehicle driveline component constructed in accordance with the teachings of the present disclosure.

It will be appreciated, however, that additionally or alternatively, the differential lubrication device 18 could comprise a pump 90. In one example, the pump 90 is a gerotor pump having a first pump member 92, which is rotatably coupled to the differential input member 30, and a second pump member 94 that is non-rotatably coupled to the housing 12. A pump discharge conduit (not specifically shown) can fluidly couple an output of the pump 90 to the internal reservoir 54. In another example, which is shown in FIG. 6, the differential lubrication device 18 does not employ a lubricant reservoir and the pump discharge conduit 100 terminates in the case cavity 36 at a location that is axially between the differential outputs 32 so as to discharge lubricant directly into the case cavity 36.

Figure 7:
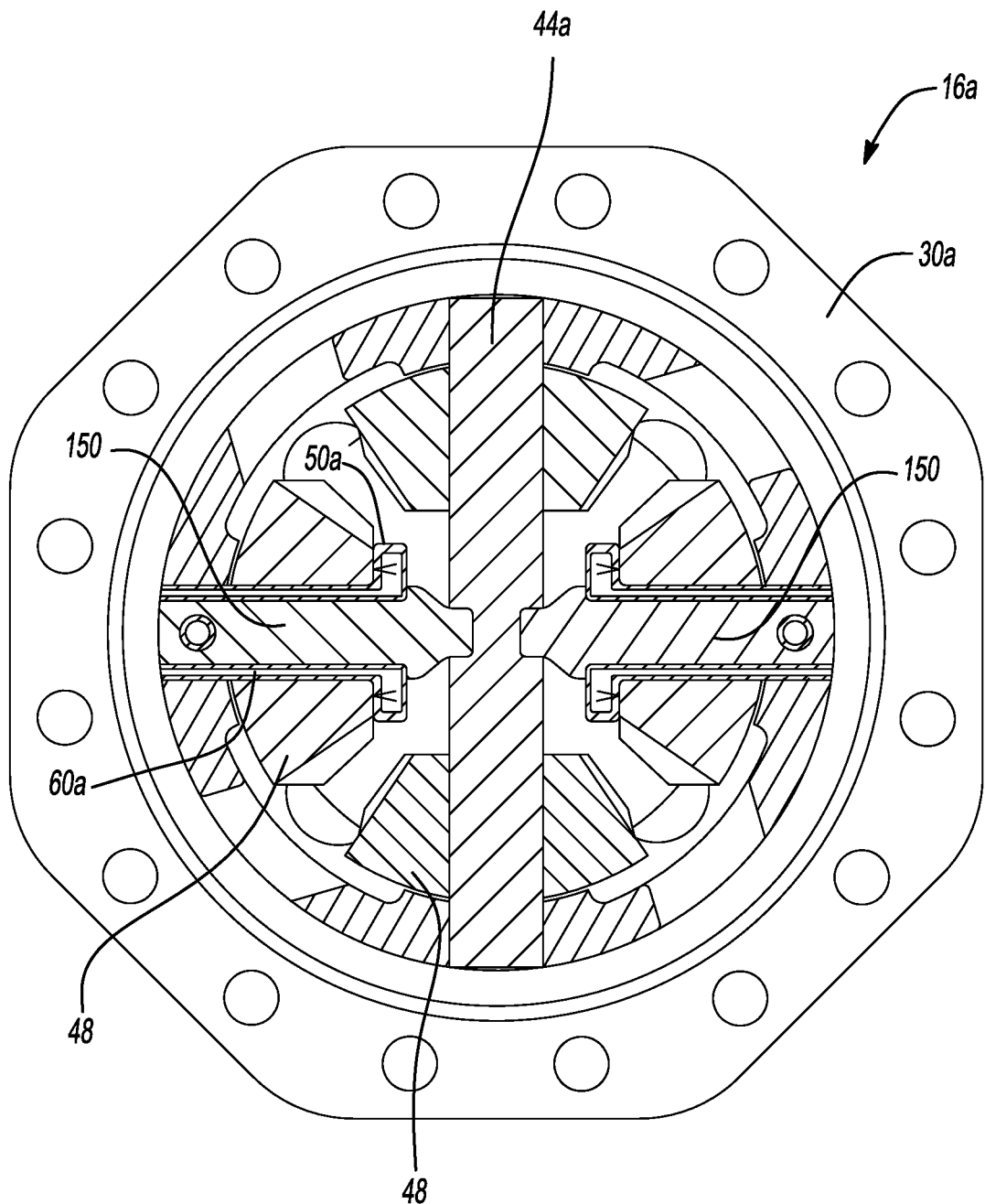
FIG. 7 is a cross-sectional view of a portion of another vehicle driveline having a differential assembly that utilizes four differential pinions and a lubricant reservoir constructed in accordance with the teachings of the present disclosure.

In FIG. 7, a cross-sectional view taken through a differential assembly 16a of a second vehicle driveline component constructed in accordance with the teachings of the present disclosure is illustrated. The differential assembly 16a employs four differential pinions 48, two of which being mounted on a "long" cross-pin 44a and the remaining two each being mounted on a "short" pin 150 that is fixed to the differential input member 30a and the "long" cross-pin 44a. The lubricant reservoir 50a and the journal 60a are disposed on one of the "short" pins 150, but it will be appreciated that another lubricant reservoir/journal (not shown) could be mounted on the opposite "short" pin 150 to help rotationally balance the differential assembly 16a. It will be appreciated that the journal 60b is disposed radially between the differential input member 30a and the pin 150, as well as radially between the differential pinion 48 and the pin 150.

In the example of FIG. 8, the differential pinions 48b have a "hubbed" configuration in which each of the differential pinions 48b has a pin 160 that is fixedly coupled to a pinion gear 162 so that both the pin 160 and the pinion gear 162 are rotatable relative to the differential input member 30b. The lubricant reservoir 50b and the journal 60b are mounted on the pin 160, such that the journal 60b is disposed radially between the pin 160 and the differential input member 30b and the lubricant reservoir 50b is disposed in the cavity 36b between the differential input member 30b and the pinion gear 162. A thrust washer 166, which can be flat on both thrust faces, can be disposed between the lubricant reservoir 50b and the pinion gear 162. Alternatively, the differential pinions 48c (only one shown) could be configured as shown in FIG. 9 so that a thrust washer 166c can be disposed directly between the differential input member 30b and the pinion gear 162c.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
   a differential input member that defines a cavity, the differential input member being rotatable about a differential axis;
   a pin that extends into the cavity;
   a pair of side gears that are received in the cavity and which are rotatable about the differential axis;
   a differential pinion received in the cavity and being meshingly engaged to the side gears; and
   a lubricant reservoir that is received in the cavity and mounted to the pin, the lubricant reservoir defining an internal reservoir and a plurality of reservoir outlet ports that fluidly couple the internal reservoir to the cavity.

2. The vehicle driveline component of claim 1, further comprising a journal that is fixedly coupled to the lubricant reservoir, the journal being disposed coaxially about the pin, the differential pinion being rotatably mounted on the journal.

3. The vehicle driveline component of claim 2, wherein the journal defines a lubricant intake port that is fluidly coupled to the internal reservoir.

4. The vehicle driveline component of claim 2, wherein the journal is disposed radially between the differential input member and the pin.

5. The vehicle driveline component of claim 2, wherein the journal is disposed radially between the pin and the differential pinion.

6. The vehicle driveline component of claim 1, wherein the reservoir outlet ports are disposed about an outer circumferential surface of the lubricant reservoir.

7. The vehicle driveline component of claim 6, wherein the reservoir outlet ports are perpendicular to a longitudinal axis of the pin.

8. The vehicle driveline component of claim 1, wherein the pin is a cross-pin on which two of the differential pinion and a second differential pinion are rotatably disposed.

9. The vehicle driveline component of claim 8, wherein the cross-pin defines a reduced-diameter portion on which the lubricant reservoir is received.

10. The vehicle driveline component of claim 1, further comprising an axle housing and a pair of axle shafts, the axle housing defining a housing cavity into which the differential input member is rotatably disposed, each of the axle shafts being coupled for rotation with an associated one of the side gears.

11. The vehicle driveline component of claim 1, further comprising a pump that is mounted to the differential input member, the pump being in fluid communication with the internal reservoir.

12. The vehicle driveline component of claim 11, wherein the pump is a gerotor pump.

13. The vehicle driveline component of claim 12, further comprising a housing that rotatably supports the differential input member, and wherein a portion of the pump is non-rotatably coupled to the housing.

14. The vehicle driveline component of claim 1, further comprising an axle housing and a ring gear, the axle housing supporting the differential input member for rotation about the differential axis and defining a housing cavity into which the differential input member is received, the ring gear being coupled to the differential input member for rotation therewith.

15. A vehicle driveline component comprising:
    a differential mechanism having a differential input member and a pair of differential outputs, the differential input member being rotatable about a differential axis, the pair of differential outputs being driven by the differential input member; and
    means for lubricating the differential mechanism, wherein the differential mechanism lubricating means comprises at least one lubricant discharge port that is disposed in a volume within the differential input member, the volume being located along the differential axis between the pair of differential outputs;
    wherein the differential mechanism lubricating means comprises a lubricant reservoir; and
    wherein the differential mechanism further comprises a pin that is coupled to the differential input member for rotation therewith, and wherein the lubricant reservoir is mounted on the pin.

16. The vehicle driveline component of claim 15, wherein the differential mechanism further comprises a differential pinion, wherein each of the differential outputs comprises a side gear, wherein the differential pinion is meshingly engaged to at least one of the side gears, and wherein the differential pinion is rotatably disposed about the pin.

17. The vehicle driveline component of claim 16, wherein the differential pinion is rotatably disposed on the lubricant reservoir.

* * * * *